US007016686B2

(12) United States Patent
Spaling et al.

(10) Patent No.: US 7,016,686 B2
(45) Date of Patent: *Mar. 21, 2006

(54) CONGESTION CONTROL IN A CDMA-BASED MOBILE RADIO COMMUNICATIONS SYSTEM

(75) Inventors: Gerke Spaling, Enschede (NL); Benedikt Aschermann, Wuppertal (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 437 days.

This patent is subject to a terminal disclaimer.

(21) Appl. No.: 10/012,250

(22) Filed: Dec. 11, 2001

(65) Prior Publication Data
US 2002/0077113 A1    Jun. 20, 2002

Related U.S. Application Data

(63) Continuation of application No. 09/736,574, filed on Dec. 15, 2000.

(51) Int. Cl.
    *H04Q 7/20* (2006.01)
(52) U.S. Cl. .................. 455/453; 455/422.1; 455/423; 455/522; 370/310
(58) Field of Classification Search ................ 455/423, 455/432.1, 435.2, 436, 450, 454, 501, 522, 455/63.1, 67.13, 452.1, 453, 69; 375/130; 370/320, 342
See application file for complete search history.

(56) References Cited

U.S. PATENT DOCUMENTS

| 5,758,090 A | 5/1998 | Doner |
| 5,839,056 A | 11/1998 | Hakkinen |
| 5,859,838 A | 1/1999 | Soliman |
| 5,924,043 A | 7/1999 | Takano |
| 5,946,346 A | 8/1999 | Ahmed et al. |
| 5,960,353 A | 9/1999 | Lee |
| 6,192,249 B1 * | 2/2001 | Padovani ..................... 455/453 |
| 6,226,526 B1 | 5/2001 | Sakoda et al. |
| 6,259,927 B1 | 7/2001 | Butovitsch et al. |
| 6,269,239 B1 * | 7/2001 | Hashem et al. ............. 455/522 |
| 6,275,711 B1 | 8/2001 | Yamada et al. |
| 6,285,664 B1 | 9/2001 | Bernstein et al. |

(Continued)

FOREIGN PATENT DOCUMENTS

WO    98/49785    11/1998

(Continued)

OTHER PUBLICATIONS

Walid Hamdy; "A Variance Based Reverse Link Overload Detection Mechanism;" QUALCOMM; Sep. 17, 1998.

(Continued)

*Primary Examiner*—Joseph Feild
*Assistant Examiner*—Kamran Afshar
(74) *Attorney, Agent, or Firm*—Nixon & Vanderhye P.C.

(57) ABSTRACT

A load condition of a cell is determined without having to measure one or more radio parameters pertaining to the cell load, e.g., interference level. Based upon that determined load condition, a traffic condition of the cell may then be regulated, e.g., admission and/or congestion control, transmit power control, etc. The load condition is determined simply and accurately by observing the value (absolute or weighted) of transmit power control commands issued in the cell over a particular time period. To identify potential "false alarms" of increased cell loads, a radio parameter associated with another frequency band in another cellular system that impacts the load condition of the cell in the current cellular system is measured. A traffic condition in that cell is regulated based upon the determined load condition in the cell taking into account the measured radio parameter.

40 Claims, 8 Drawing Sheets

U.S. PATENT DOCUMENTS

| | | | |
|---|---|---|---|
| 6,314,293 B1 * | 11/2001 | Servi et al. | 455/450 |
| 6,317,600 B1 * | 11/2001 | Salonaho et al. | 455/453 |
| 6,330,456 B1 | 12/2001 | Hashem et al. | |
| 6,334,058 B1 | 12/2001 | Nystrom et al. | |
| 6,343,218 B1 | 1/2002 | Kaneda et al. | |
| 6,389,265 B1 | 5/2002 | Jeschke et al. | |
| 6,418,137 B1 | 7/2002 | Bontu et al. | |
| 6,434,380 B1 | 8/2002 | Andersson et al. | |
| 6,463,295 B1 | 10/2002 | Yun | |
| 6,477,380 B1 | 11/2002 | Uehara et al. | |
| 6,477,388 B1 | 11/2002 | Schmutz | |
| 6,493,564 B1 | 12/2002 | Longoni et al. | |
| 6,512,925 B1 | 1/2003 | Chen et al. | |
| 6,600,772 B1 * | 7/2003 | Zeira et al. | 455/522 |
| 6,603,773 B1 | 8/2003 | Laakso et al. | |
| 6,708,041 B1 * | 3/2004 | Butovitsch et al. | 455/522 |
| 6,799,045 B1 * | 9/2004 | Brouwer | 455/453 |
| 6,934,268 B1 * | 8/2005 | Hedlund et al. | 370/311 |
| 2001/0017882 A1 * | 8/2001 | Umeda et al. | 375/130 |
| 2002/0055367 A1 | 5/2002 | Hamabe et al. | |
| 2002/0077111 A1 * | 6/2002 | Spaling et al. | 455/453 |
| 2002/0082037 A1 | 6/2002 | Salonaho et al. | |
| 2002/0111163 A1 * | 8/2002 | Hamabe | 455/423 |

FOREIGN PATENT DOCUMENTS

| | | |
|---|---|---|
| WO | 99/16185 | 4/1999 |
| WO | 00/33475 | 6/2000 |
| WO | 00/38348 | 6/2000 |
| WO | 00/59131 | 10/2000 |

OTHER PUBLICATIONS

Patent application of Brouwer; "Reliable Congestion Control in a CDMA-Based Mobile Radio Communications System;" U.S. Appl. No. 09/707,159; filed Nov. 7, 2000.

Patent application of Spaling et al.; "Uplink Admission and Congestion Control in a CDMA-Based Mobile Radio Communications System;" U.S. Appl. No. 09/736,574; filed on Dec. 15, 2000.

* cited by examiner

BS1 = Belongs to System 1
BS2A,B = Belong to System 2
UE2 = Belongs to System 2

CONGESTION CONTROL IN A CDMA-BASED MOBILE RADIO COMMUNICATIONS SYSTEM

RELATED APPLICATIONS

This application is related to commonly-assigned U.S. patent application Ser. No. 09/707,159, filed Nov. 7, 2000, entitled "Uplink Admission Measurement," and is a continuation-in-part of U.S. patent application Ser. No. 09/736,574 filed Dec. 15, 2000.

FIELD OF THE INVENTION

The present invention relates to mobile radio communications, and more particularly, to congestion control in a CDMA-based mobile radio communications system.

BACKGROUND AND SUMMARY OF THE INVENTION

In a mobile radio communications system, a mobile radio station communicates over an assigned radio channel with a radio base station. Several base stations are usually connected to a switching node, which is typically connected to a gateway that interfaces the mobile radio communications system with other communications systems. A call placed from an external network to a mobile station is directed to the gateway, and from the gateway through one or more nodes to a base stations which serves the called mobile station. The base station pages the called mobile station and establishes a radio communications channel. A call originated by the mobile station follows a similar path in the opposite direction.

In a spread spectrum, Code Division Multiple Access (CDMA) mobile communications system, spreading codes are used to distinguish information associated with different mobile stations or base stations transmitting over the same frequency band. In other words, individual radio "channels" correspond to and are discriminated on the basis of these codes. Each coded signal overlaps all of the other coded signals as well as noise-related signals in both frequency and time. By correlating a composite signal with one of the distinguishing spreading codes, the corresponding information can be isolated and decoded.

Spread spectrum communications permit mobile station transmissions to be received at two or more "diverse" base stations and processed simultaneously to generate one received signal. With these combined signal processing capabilities, it is possible to perform a "handover" from one base station to another without any perceptible disturbance in the voice or data communications. This type of handover is typically called diversity handover and may include a "soft" handover between two base stations and a "softer" diversity handover between two different antenna sectors connected to the same, multi-sectored base station.

Because all users of a CDMA communications system transmit information using the same frequency band at the same time, each user's communication interferes with the communications of other users. In addition, signals received by a base station from a mobile station that is close to the base station are much stronger than signals received from other mobile stations located at the base station cell boundary. As a result, close-in mobile stations may overshadow and dominate more distant mobile communications, which is why this condition is sometimes referred to as the "near-far effect." Thus, control of mobile transmit power level is important in order to prevent such near-far effects. Power control is also needed to compensate for changing physical characteristics of a radio channel. Indeed, the signal propagation loss between a radio transmitter and receiver varies as a function of their respective locations, obstacles, weather, etc. Consequently, large differences may arise in the strength of signals received at the base station from different mobiles.

Ideally, all mobile-transmitted signals should arrive at the base station with about the same average power irrespective of the path loss to the base station. By regulating transmit power to the minimum necessary to maintain satisfactory call quality, capacity at the mobile radio communications system can be increased approximately seventy percent as compared with an unregulated system, (assuming that all the calls or connections have the same target signal-to-interference ratio). In addition, mobile stations consume less energy when transmit power levels are maintained at a lowest possible level, thereby reducing battery drain which results in mobile stations lighter in weight and smaller in size.

If the transmission power from a mobile signal is too low, (for whatever reason), the receiving base station may not correctly decode a weak signal, and the signal will have to be corrected (if possible) or retransmitted. Erroneous receipt of signals adds to the delay associated with radio access procedures, increases signal processing overhead, and reduces the available radio bandwidth because erroneously received signals must be retransmitted. On the other hand, if the mobile transmission power is too high, the signals transmitted by the mobile station create interference for the other mobile and base stations in the system.

A significant problem in CDMA systems with transmitting too much power is the so-called "party effect." If one mobile transmits at too high of a power level, (a person is talking too loudly at a party), the other mobiles may increase their power levels so that they can be "heard," (over the loud talker), compounding the already serious interference problem. As each mobile increases its transmit power, (becomes a loud talker), the other mobiles react by raising their transmit powers. Soon all mobiles may be transmitting at maximum power with significantly degraded service and diminished capacity. Thus, while transmit power control is important in any mobile radio communications system, it is particularly important to the performance and capacity of a CDMA-based mobile radio communications system.

One parameter affecting the capacity of a CDMA-based system that can be measured by a base station is the total uplink (from mobile station-to-base station) interference level at the base station. The uplink interference includes the sum of all radio beams that reach a receiver in the base station for a specific radio frequency carrier, plus any received noise or interference from other sources. Because of the importance of interference level to the capacity of the CDMA-based radio network, a radio network controller normally receives measurement reports from radio base stations including periodic uplink interference and downlink power measurements. These measurement reports may be used by call admission and congestion control functions of the radio network controller. If the downlink power and uplink interference levels are sufficiently low, the admission control function may "admit" a new call request and allocate the appropriate radio resources, assuming other conditions are met, e.g., there are sufficient radio resources currently available. However, if there are insufficient resources or the cell is at capacity or in an overload condition, the admission control function may restrict or reduce the amount of traffic and thereby interference. For example, new mobile connection requests may be rejected, data throughput may be reduced, data packets delayed, handovers to other frequencies/cells forced to occur, connections terminated, etc. Of course, these types of actions should be employed only where necessary; otherwise, the cellular network services and capacity are unnecessarily reduced.

Accordingly, it is an important goal in a CDMA-based cellular radio system to optimize the capacity of a particular cell without overloading that cell. Some type of metric is needed that provides an accurate measurement or other indicator of the current capacity, congestion level, or load in a cell. One possible metric is total received uplink interference as measured by the base station. Measurement of total received uplink interference can be made using some sort of power sensor such as a diode. For example, the voltage detected across the diode can be used to indicate the received uplink interference.

Unfortunately, a limitation with this measurement-based metric is accuracy. It is very difficult to accurately measure total uplink received power using these types of sensors because the outputs of such sensors change with temperature, aging, component tolerances, etc. Thus, while a desired measurement accuracy of the total uplink received power or interference level may be +/−1dB (or less), the actual measurement accuracy possible with such absolute value measurement techniques may only be +/−3–5 dB, when considering economic and product restrictions like manufacturing cost, volume, power consumption, etc.

Such a measurement margin means that the maximum capacity of a cell must account for this uncertainty. To guarantee that the power or interference level does not exceed a particular maximum value in a cell, it is necessary to include a margin that equals the largest possible error. In other words, the maximum capacity for a cell must be designed lower than necessary in order to account for the fact that the power or interference level measurement might well be 5 dB lower than the actual power or interference level. The price for such safety margins because of inaccurate measurement is high. The loss in capacity between a power or interference level measurement uncertainty of +/−1 dB and +/−3–5 dB is on the order of twenty to forty percent.

Another metric that might overcome the difficulties with accurately measuring the absolute received power or interference level in a cell is a measurement of the variance or standard deviation of received power or interference. This variance metric is useful because it is only measuring a relative value, i.e., changes from one measurement instance to another. Thus, the absolute measurement accuracy is not as important as with the previous metric. The underlying premise of such a variance metric is that as the loading of a cell increases, so does the variance of the received power. One problem with this approach is that too much time is needed to obtain the necessary statistics to calculate the variance.

A metric is employed that overcomes the problems with absolute measurement and variance measurement metrics. Rather than measuring the absolute or relative value of a particular radio parameter or condition in a cell, the load situation of a cell is determined without the need to measure that load condition. Based upon that determined load condition, a traffic condition of the cell may then be regulated, e.g., by an admission and/or congestion control algorithm. The load situation is determined simply and accurately by observing the value of transmit power control commands issued in the cell over a particular time period. In one example implementation, the number of increase transmit power commands issued in a cell over a particular time period is determined relative to a total number of transmit power commands, (i.e., both increase and decrease), issued in the cell for that same time period. If the number of increase transmit power commands relative to the total number of transmit power commands exceeds a threshold, an overload condition may be indicated. When an overload is indicated, an action may be taken that reduces the load in the cell. In a preferred example, the present invention is used in the context of uplink power control. However, the invention may also be applied in a downlink power control context.

An alternative example implementation is to monitor the number of increase power commands issued in the cell over the time period relative to the number of decrease power commands for that same time period. If a difference between a number of increase and decrease transmit power commands exceeds a threshold, action can be taken to reduce the load in the cell. Both example implementations may employ one or more counters operated at a sufficiently high clocking speed in accordance with the frequency of transmit power commands being issued. One or more counters provide a simple and inexpensive way to implement the present invention.

Additional optional features may be used to advantage along with power command observation-based control procedures. For example, averaging of the counter output may be employed to reduce the network reaction to transient fluctuations. Furthermore, it may be desirable to detect the rate of change of the counter output in order to vary the threshold of the threshold detector. A significant rate increase in the number of increase power control commands may indicate a potentially unstable situation. As a result, the threshold value could be decreased to prompt a quicker network reaction to the unstable situation.

Another optional feature is for the base station to "weight" the power command values so that the weighted transmit power control command values reflect the different degrees to which those commands will likely impact the cell load/congestion condition. For example, transmit power increases (and decreases) for higher bit rate connections will have a greater impact than those for lower bit rate connections. Transmit power increases in only a few high bit rate connections may well lead to a congestion condition faster than power increases in many more low bit rate connections.

By observing values of transmit power control commands (TPCCs) issued in a cell over a particular time period, the present invention provides an effective, efficient, and cost effective method to accurately detect and regulate the load condition of a cell. Because the TPCC metric is not measured—but counted—a margin of error need not be used, which margin may significantly reduce capacity in the cell. The amount of traffic and/or the power level in a cell can therefore be regulated to optimize the cell's capacity without creating an unstable or undesirable situation, e.g., a "party effect" ramp-up of transmit power/interference.

Still further, it may be desirable to avoid a "false alarm" or other undesired network reaction in certain situations by considering one or more other factors along with observed power command values. For example, a relative power measurement may be employed to determine whether the received signal strength really is increasing. Relative measurements do not suffer from the same inaccuracy as absolute measurements, at least not during short time intervals, e.g., on the order of milliseconds to seconds.

One type of false alarm condition may be caused by high power transmissions from mobile radios transmitting in adjacent frequency bands in other cellular networks. Additional information may be used to determine whether a network reaction is desirable to regulate traffic conditions of a cell where the load condition has been determined in the first cellular system. Thus, in addition to determining a load condition in a current cell of a "first" cellular system is determined, a radio parameter associated with a second cellular system's frequency band that impacts the load condition of that current cell is measured. Thereafter, a traffic condition in the cell is regulated based upon both the determined load condition and the measured radio parameter.

More specifically, if the measured parameter from the second cellular system frequency band exceeds a threshold, then a determination is made that at least some of the load condition in the current cell in the first cellular system is attributable to the second cellular system. In other words, the traffic condition in the cell is regulated in a first fashion if the load condition is attributable, at least to a first extent, to the second cellular system. On the other hand, the traffic condition in the cell is regulated in a second fashion if the load condition is not attributable, at least to a first extent, to the second cellular system.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION OF THE INVENTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, the present invention may be implemented in any cellular radio communications system using power control commands. One specific, non-limiting application of the invention is in a CDMA radio communications system.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors DSPs).

Figure 1:
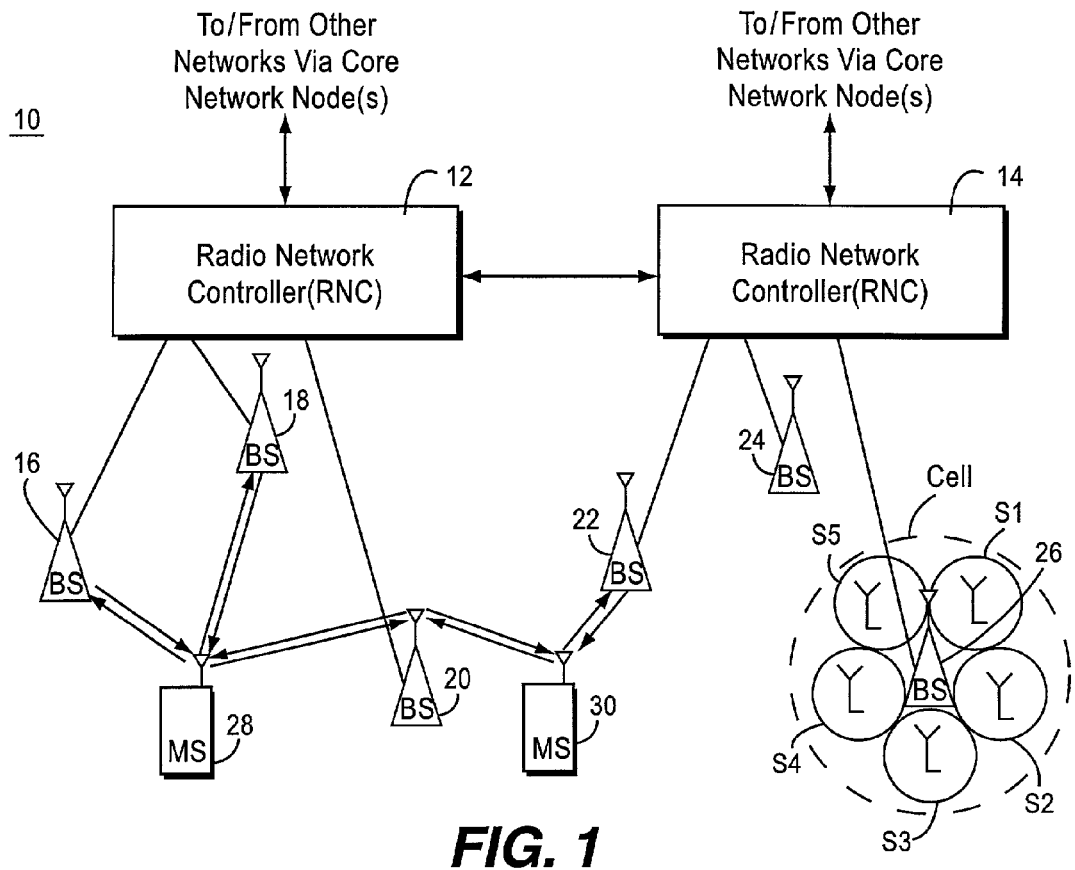
FIG. 1 illustrates an example mobile radio communications network in which the present invention may be employed.

An example mobile radio cellular communications system 10 is shown in FIG. 1 and may be, for example, a CDMA or a wideband CDMA communications system. Radio network controllers (RNCs) 12 and 14 control various radio network functions including for example radio access bearer setup, diversity handover, etc. More generally, each RNC directs mobile station calls via the appropriate base station(s). Radio network controller 12 is coupled to a plurality of base stations 16, 18, and 20. Radio network controller 14 is coupled to base stations 22, 24, and 26. Each base station serves a geographical area, referred to as a cell, and a cell may be divided into plural sectors. Base station 26 is shown as having five antenna sectors S1–S5. Each sector also has a corresponding cell area so that in this situation the base station serves five cells. The base stations are coupled to their corresponding radio network controller by a digital link established via dedicated telephone lines, optical fiber links, microwave links, etc. Both radio network controllers 12 and 14 are connected with external networks such as the Public Switched Telephone Network (PSTN), the Internet, etc. through one or more core network nodes like a mobile switching center (not shown) and/or a packet radio service node (not shown).

In FIG. 1, two mobile stations 28 and 30 are shown communicating with plural base stations in diversity handover situations. Mobile station 28 communicates with base stations 16, 18, and 20, and mobile station 30 communicates with base stations 20 and 22. A control link between radio network controllers 12 and 14 permits diversity communications to/from mobile station 30 via base stations 20 and 22. Each radio communication channel established between the mobile station and a base station has an uplink component and a downlink component. Since multiple communications utilize the same radio frequencies in CDMA communication, spreading codes along with other well-known CDMA techniques are used to distinguish between the various mobile station and base station communications. In this example embodiment, the term "channel" refers to a CDMA channel which, for any mobile station, is defined in terms of an RF frequency and a particular code sequence.

Figure 2:
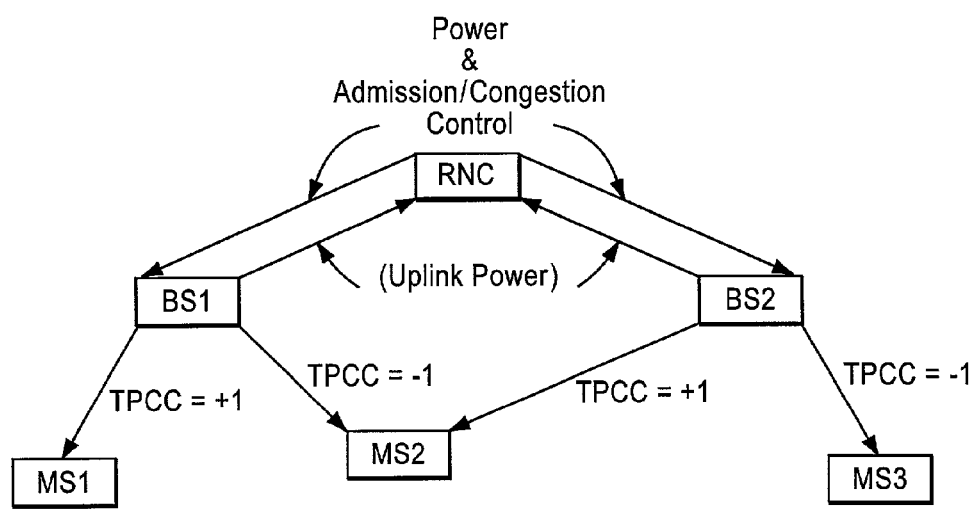
FIG. 2 is a diagram illustrating an example uplink power control and admission/congestion control in the mobile radio communications network of FIG. 1.

FIG. 2 is a diagram illustrating example power control and admission and congestion control signaling. For purposes of illustration, but not for limitation, the following example embodiments of the present invention are described in the context of an uplink (from mobile-to-base station) transmit power control situation. However, it will be understood that the present invention may also be implemented in the downlink power control context (from base station-tomobile station). The mobile station transmits power commands to the base station instructing the base station to increase or decrease its transmit power to the mobile station based on a target value typically set by the RNC.

In uplink power control, there is often an "inner loop" and an "outer loop." In the inner loop control, the base station performs a signal quality measurement, e.g., C/I, of a signal received from a mobile station and compares it to a target signal quality value provided by the RNC in the outer loop control. The base station compares the two values, and based on the comparison, sends and increase or decrease transmit power control command to the mobile station. The inner loop power control is usually performed very often, e.g., every slot, commanding the mobile station to increase or decrease its transmit power in small increments, e.g., 0.5 dB or 1.0 dB. In the outer loop control, the RNC performs a measurement to determine the radio link quality, e.g. Bit Error Rate (BER), and compares it to a target value that is predetermined. Based on this evaluation the outer loop power control can send a correction of the C/I target to the inner loop power control. To determine the load on the air interface the base station measures uplink interference or power levels in a cell and periodically provides that information to the RNC, which in turn performs admission and congestion control operations.

In FIG. 2, there are example signaling links between a radio network controller (RNC), two base stations BS1 and BS2, and three active mobile stations MS1, MS2, and MS3. The traffic links are not shown. Base station BS1 is involved in a direct communication with MS1 as well as a diversity communication with MS2. Because of changes in path loss from MS1 to BS1, (e.g., due to movement or fading), base station BS1 sends a transmit power control command (TPCC) requesting that MS1 increase (+1) its transmit power by some small incremental step, e.g., 0.5 dB or 1.0 dB.

MS2 is in diversity handover with base stations BS1 and BS2. When path loss from MS2 to BS1 decreases, (e.g., due to movement of MS2), and MS2 is transmitting with greater than necessary power for satisfactory reception by BS1, BS1 sends a decrease power command (−1) to MS2. On the other hand, if the path loss from the mobile station MS2 to base station BS2 increases due to the same movement, BS2 sends an increase (+1) transmit power control command to mobile station MS2. In a diversity handover situation, it may be advisable for a mobile station to only increase its transmit power only if every one of the diversity base stations requests a power increase. Otherwise, the mobile station decreases its power. In the illustrated diversity situation, because the mobile station MS2 receives one decrease and one increase power command from BS1 and BS2, respectively, MS2 decreases its power. Similarly, if BS2 is receiving a signal from MS3 at a more than satisfactory power level, a decrease power command (−1) is issued to MS3. The base stations provide uplink power and/or interference measurements to the RNC which performs power control as well as admission/congestion control operations.

Figure 3:
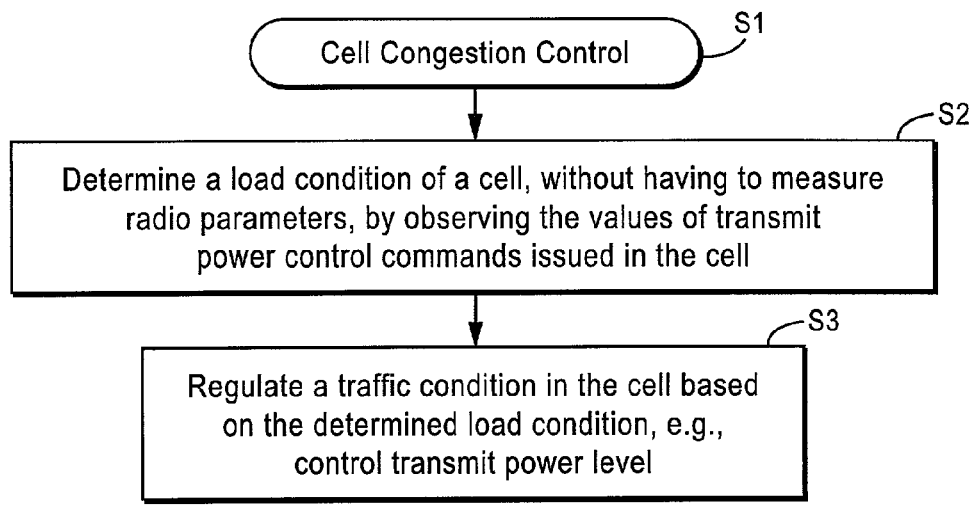
FIG. 3 is a flowchart diagram of procedures for implementing one example embodiment of the present invention.

In a first general example embodiment of the present invention illustrated in flowchart form in FIG. 3, cell congestion is regulated using a metric that is not dependent upon measuring a particular radio parameter such as uplink interference or power. As described above, such measurements are not accurate and inject an uncertainty that results in unnecessary lost cell capacity. In the cell congestion control routine (S1) of FIG. 3, the load condition in the cell is determined without having to measure radio parameters. A preferred way of making that determination, (without measurement of radio parameters), involves observing transmit power control commands issued in the cell over a particular time period (step S2). Based on that determined load condition, a traffic condition is regulated in that cell, e.g., new calls/services are admitted or denied, etc. (step S3). In a normal traffic situation, the number of power-up commands should on average equal the number of power-down commands. Thus, a potential "party effect" situation will be indicated by an increasing number of power-up commands. If the number of power-up commands reaches a certain level, a load reduction or other appropriate action may be taken.

Figure 4:
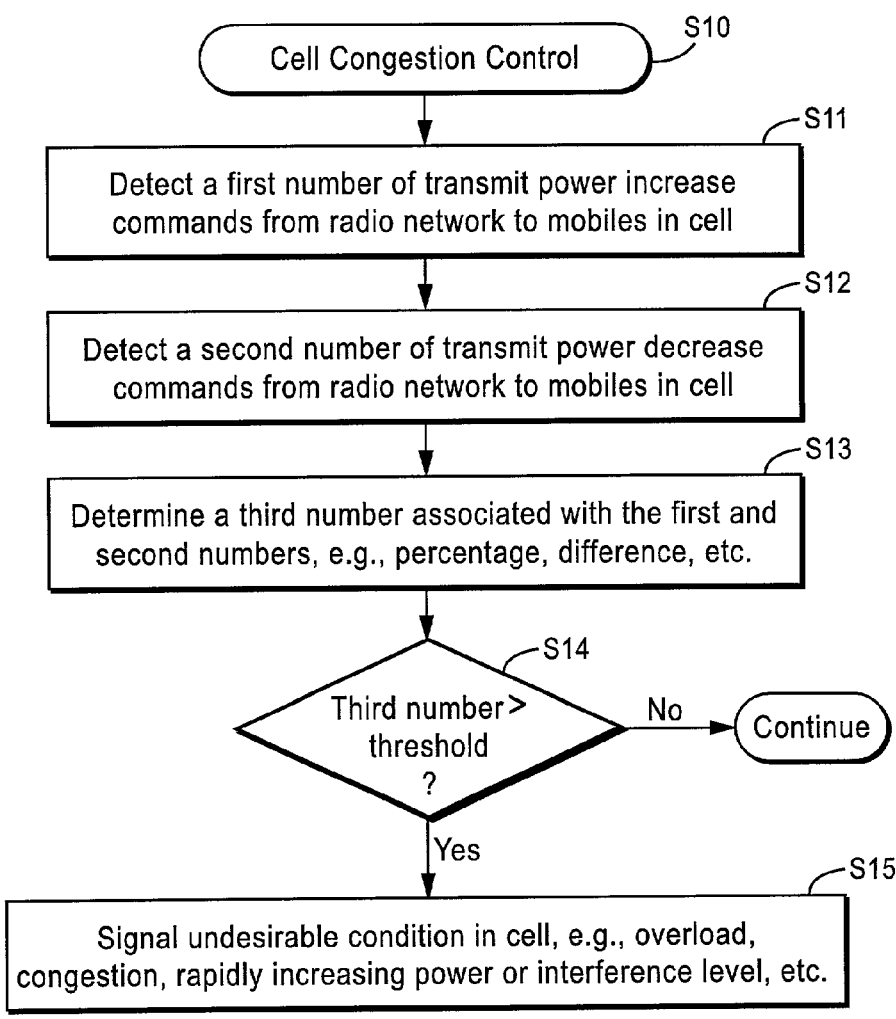
FIG. 4 is a flowchart diagram of procedures for implementing one example embodiment of the present invention.

The cell congestion control routine (S10) in FIG. 4 is a non-limiting, specific example of how transmit power control commands can be observed and used. A first number of transmit power increase commands is detected from the radio network to mobiles within a cell (step S11). A second number of transmit power decrease commands is detected from the radio network to mobiles in that cell (step S12). A third number is then determined associated with the first and second numbers (step S13). For example, the third number might be the percentage of power-up commands relative to a total number of power-up and power-down commands. Alternatively, the third number could be a difference between power-up and power-down commands. A decision is made (step S14) whether the third number is greater than a threshold. If it is, an undesirable condition in the cell is signaled in some fashion (step S15). For example, there might be an indication of an overload condition, a congestion situation, a rapidly increasing power situation, an interference limit, etc. If warranted, affirmative action may be taken by the radio network to reduce congestion by blocking admission attempts, reducing transmit power levels, or by taking some other action that results in a reduction of the third number.

Figure 5:
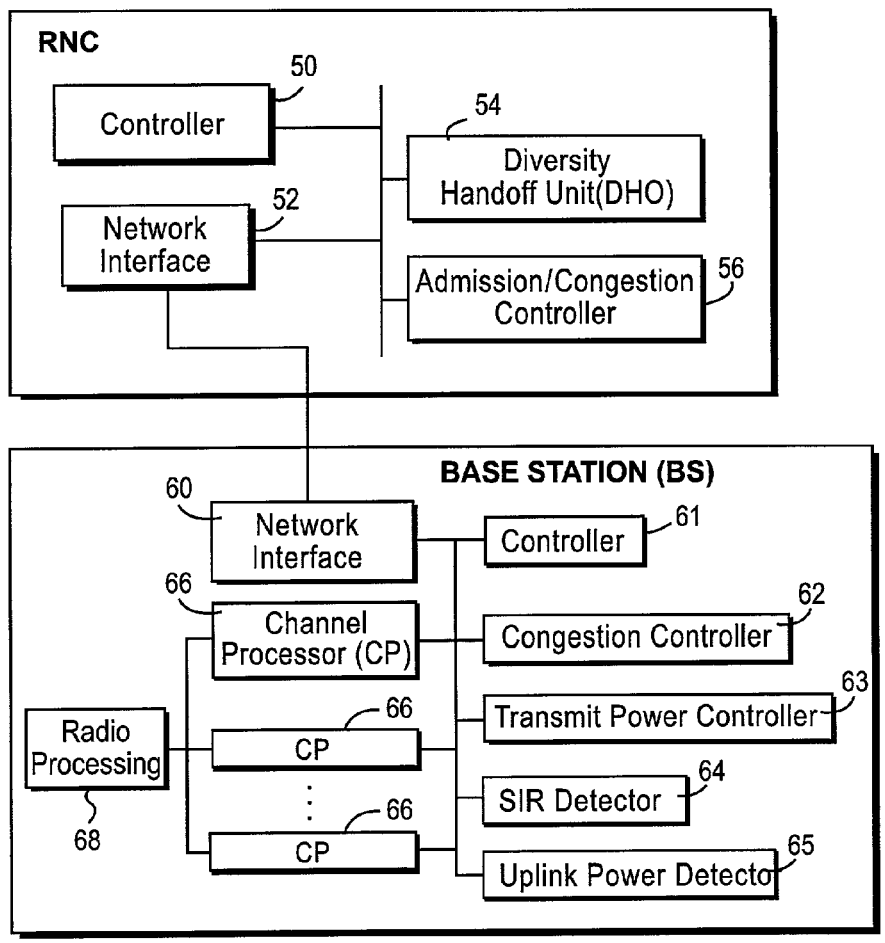
FIG. 5 is a function block diagram illustrating a radio network controller and a base station.

Some additional details of a base station and a radio network controller that may be used to implement the invention are now provided in conjunction with FIG. 5. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs functions required for establishing, maintaining, and dropping diversity connections, such as diversity combining, diversity splitting, power control and other link related radio resource control algorithms. An admission/congestion controller 56 receives information from each base station relating to TPC commands recently issued, and possibly other information, such as uplink received power or interference level (used in another example embodiment of the invention). The admission/congestion controller 56 also responds to requests to allocate new radio resources and takes action where necessary to regulate traffic conditions in the cell if an overload or congested condition is detected. The RNC may include other control/functional units not necessary to the understanding of the invention.

Each base station (BS) includes a corresponding network interface 60 for interfacing with the RNC. In addition, the base station includes a controller 62 connected to one or more representative channel processors 64–68 that perform spreading and de-spreading operations, among other functions. In this example, a plurality of channel processors 64, 66, and 68, are shown coupled to a transmit power controller 72. Controller 62 controls the overall operation of the base station as well as the establishment, maintenance, and release of radio connections. Representative channel processors 64–68 are individually assigned to specific communications with mobile stations. At least one channel processor is employed as a common control channel over which the base station transmits common signaling such as pilot, synchronization, or other broadcast signaling. Mobile stations within or near that base station's cell(s) monitor the common channel. Transmit power controller 72 performs power control operations based on its own measurements and based on messages received from the RNC and/or from mobile stations. One or more signal-to-interference ratio (SIR) detectors 74 (only one is shown for purposes of illustration) may be used to detect the SIR of signals received from mobile stations. Other signal quality detectors may be employed, e.g., CIR, RSSI, etc. such as an uplink power detector 76. Detector 76 may be a diode for measuring total uplink received signal strength or interference level at the base station.

Figure 6:
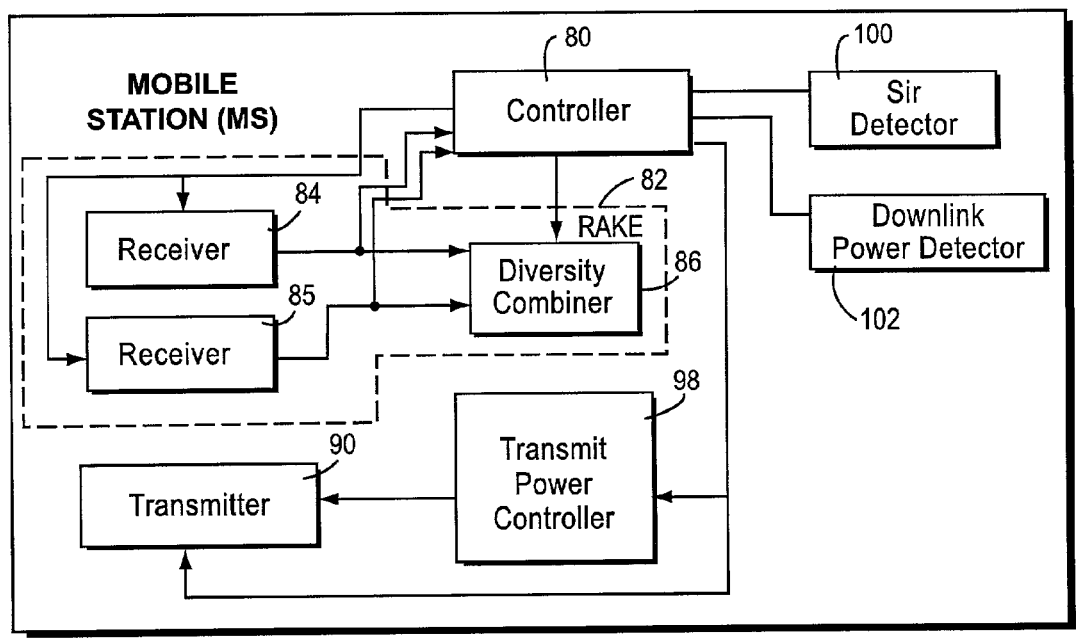
FIG. 6 illustrates a function block diagram of a mobile station.

FIG. 6 illustrates additional details of a mobile station. The mobile station includes a controller 80 connected to a RAKE receiver 82, a transmit power controller 88, a transmitter 90, an SIR (or other signal quality) detector 100, and a downlink power detector. The RAKE receiver 82 includes plural receivers 84 and 85 (there may be additional receivers as well) connected to a diversity combiner 86. One or more signal strength detectors (not shown) or similar detector(s) are employed in the mobile receiver 82 to detect the signal strength or other parameter of received signals. The transmissions from base stations are received as multipaths in the receivers 84 and 85, combined in diversity combiner 86, and processed as one signal. Transmit power controller 98 determines the transmit power level (e.g., as a signal-to-interference ratio (SIR)) of the received, diversity-combined signal.

The transmit power control (TPC) commands may include one or more bits which indicate a desired increase in transmit power, a desired decrease in transmit power, or in some cases, no change in transmit power. Of course, any number of bits or bit assignments is possible. In order to compensate for rapidly changing transmission conditions, transmit power control commands may be sent very frequently, e.g., every 0.625 millisecond time slot.

Figure 7:
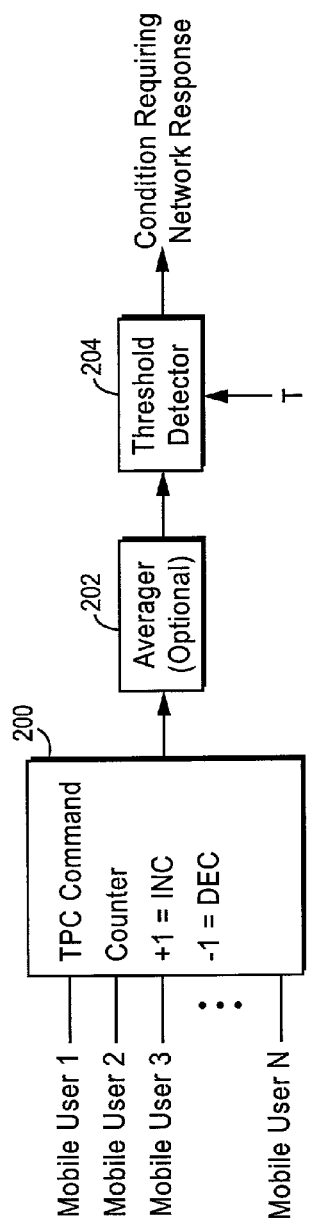
FIG. 7 illustrates an example transmit power control command counter implementation of the present invention.

FIG. 7 shows a TPC command counter that may be implemented using hardware or software in the radio base station, but it could also be implemented in the RNC, if desired. The TPC command counter may be clocked at a frequency that accommodates the frequency at which TPC commands are issued. For example, if TPC bits are issued every 0.625 millisecond time slot, and 50 mobile users are assumed per cell, 80 kbits of data must be processed per second by the counter. If the counter has an 8-bit parallel output, that output needs to be processed at 11.2 kbps, a rate easily handled with current signal processing electronics.

Returning to FIG. 7, a transmit power control command counter 200 detects transmit power increase and decrease commands from each mobile user in a particular cell, e.g., mobile users 1, 2, 3, . . . , N. An increase power command increments the counter 200, while a decrease power command decrements the counter 200. An averager 202 may be used optionally to average the value generated by the counter 200. In this case, the counter output is the difference between the number of increase and decrease power commands. The averager 202 effectively "smooths out" any abrupt, momentary changes, and thereby avoids a false alarm situation that would cause the network to take some premature or unnecessary action. A threshold detector 204 detects the output from the counter 200 or optionally from the averager 202 and compares it with a threshold T. If the threshold T has been exceeded, a signal may be generated indicating a condition requiring radio network attention and/or responsive action. The threshold T may be set by calculated design or determined based on empirical data. Such action might include reducing the transmit power level of some mobile station transmitters, reducing service, denying new service requests, or other actions.

Figure 8:
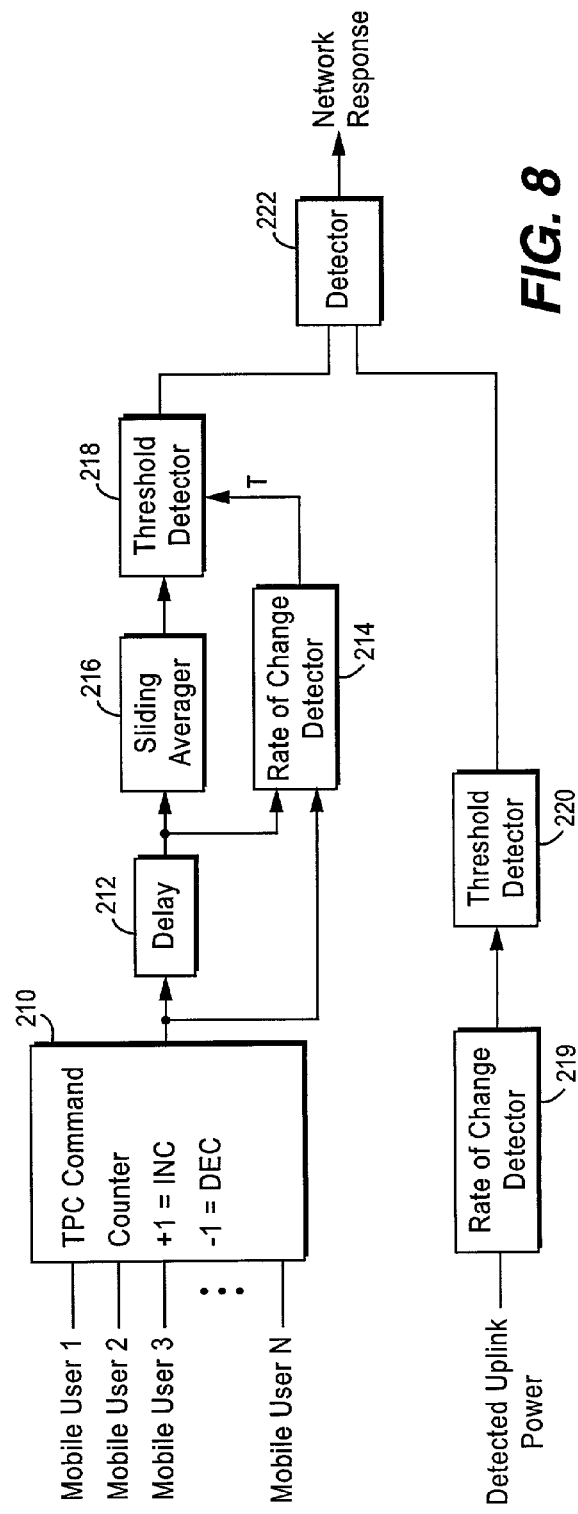
FIG. 8 illustrates another example transmit power control command counter implementation of the present invention.

FIG. 8 shows another example embodiment using a TPC command counter. As in FIG. 7, a TPC command counter 210 detects transmit power increase and decrease commands from each mobile user in a particular cell, e.g., mobile users 1, 2, 3, . . . , N. An increase power command increments the counter 210, while a decrease power command decrements the counter 210. A sliding averager 216 may be used to average the value generated by the counter 210 using a sliding window technique. In this case, the counter output is the difference between the number of increase and decrease power commands. The average is taken of values received within a certain time window. As the window "moves" in time, older values are discarded and newer values are observed. The sliding averager 216 effectively "smooths out" any abrupt, momentary changes to avoid a false alarm situation, but still provides a reasonably quick response to recent counter outputs that show a sustained increase in the counter output. A threshold detector 218 detects the output from the sliding averager 216. If the comparison detects that a threshold T has been exceeded, a signal is provided to a detector 222 which may simply perform a logical operation like an "AND" operation.

A rate of change detector 214 is coupled to the input and output of a delay element 212 interposed between the TPC command counter 210 and the sliding averager 216. The value of the delay may be for example on the order of one frame, e.g., 10 milliseconds. The rate of change detector 214 detects when the counter output is changing in a rapid fashion, indicating perhaps an unstable situation that may require immediate response from the network. In this kind of unstable situation, the rate of change detector 214 varies the value of the threshold T, e.g., decreases the value of T for a rapidly increasing counter output.

Figure 9:
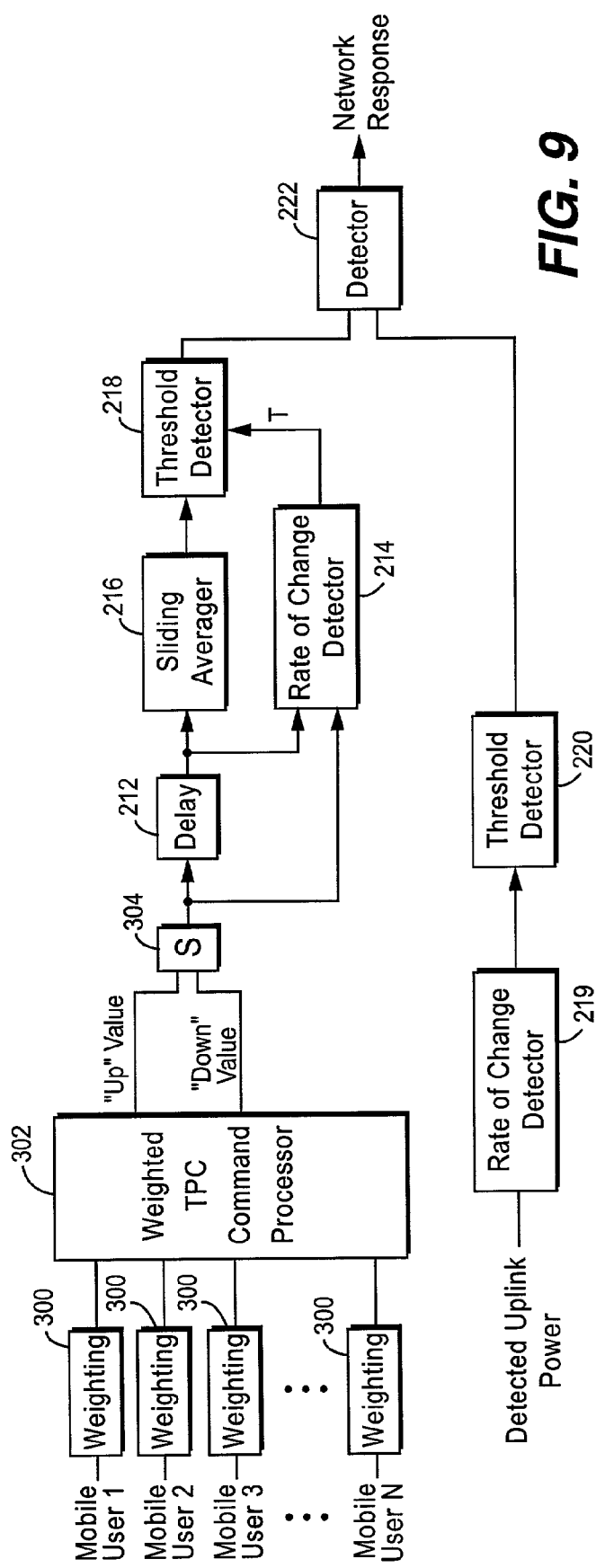
FIG. 9 illustrates another example embodiment of the present invention that employs weighted transmit power control commands.

FIG. 9 illustrates another example implementation of the invention where the transmit power control commands are "weighted" to reflect the different degrees to which those commands will likely impact the cell load/congestion condition. For example, transmit power increases (and decreases) for higher bit rate connections will have a greater impact than those for lower bit rate connections. Transmit power increases in only a few high bit rate connections may well lead to a congestion condition faster than power increases in many more low bit rate connections. Weighting of the TPC commands, therefore, provides additional accuracy to the TPCC-based determination of a load condition in the cell.

Each of N active mobile connections is assigned a weight in a corresponding weighting block 300. In this example, the weight is assigned by the base station congestion controller 62. The range of weight values may be, for example, from something close to zero up to one, with the larger weight values being assigned to higher bit rate connections and lower weight values being assigned to lower bit rate connections. Other criteria besides or in addition to bit rate could be used by the congestion controller to determine what weight value should be applied to a particular transmit power control command. The weights are multiplied by their corresponding transmit power control command, either positive or negative. The weighted commands are selectively added in the weighted TPC command processor 302 to generate a transmit power control command "up" value and a transmit power control command "down" value. It may be useful in some applications to know the "up" and "down" values, and even how many mobile connections make up the "up" and "down" values. In this example, the "up" and "down" weighted TPC sums are added algebraically in summer 302 to generate a total weighted TPC value which is then processed, for example, in the same way as in FIG. 8. Alternatively, the congestion controller 62 may calculate a percentage increase by dividing the "up" value by the sum of the absolute values of the "up" and "down" weighted TPC sums.

There may be situations where additional information may be useful or needed in order to avoid false alarms. For example, in some transmit power control algorithms, if a mobile radio in diversity handover receives a decrease power command from one of the diversity base stations, the mobile station always decreases its transmit power even though other diversity base stations may have requested a power increase. Thus, in this situation, there will be transmit power commands issued by a base station which are ignored by the mobile station. Nevertheless, that increase power command has been counted in the TPC command counter as an increase even though it has not been followed. The counting of power-up commands that have been ignored may result in false alarms.

To avoid this false alarm problem, an additional parameter such as the rate of change in detected uplink power or interference is used. In addition to monitoring the values of the power control commands transmitted to mobile stations in each cell, each base station also measures the received uplink power or interference level for each cell using a power sensor, (e.g., a diode). Referring back to FIG. 8, an optional rate of change detector 219 detects how fast the measured uplink power or interference is changing. The threshold detector 220 detects if the rate of change of the measured uplink power or interference level at the base station exceeds a threshold for the cell. When threshold exceeded outputs from both threshold detectors 218 and 220 are detected in logic detector 222, a condition requiring a possible radio network response is indicated. Accordingly, each base station may provide to the RNC the following information for each cell: a total uplink received power or interference measurement, a number of active mobile users per cell for that time interval, the number of increase transmit power commands, and/or the number of decrease transmit power commands for that interval.

There may be other situations in which additional information outside of the cell's frequency band or the cell's "home" cellular system is useful in protecting against potential false alarms in the context of admission and congestion control. Consider the example situation shown in FIG. 10. Two different cellular systems may be adjacent or overlapping in their coverage areas, and typically are allocated different frequency bands. Cellular system 1 is represented by base station BS1 and might employ frequencies in a first 5 MHz band. Cellular system 2 is represented by base stations BS2A and BS2B and might employ frequencies in an adjacent 5 MHz band. A mobile radio, identified as UE2, communicates desired signals to one or both (soft handover) of the base stations in BS2A and BS2B in the second cellular system.

Because the mobile radio UE2 is fairly distant from its two "home" base stations, it is transmitting at a high power level. Even though UE2 transmits on a different frequency band, its close proximity to BS1 means that UE2's high power transmission "leaks" into BS1's uplink frequency band causing increased noise. This increase noise in BS1's cell causes the base station BS1 to generate a series of power-up commands to various mobiles (not shown) communicating in its cell area. Thus, simply counting the number of transmit power control commands in the cell to determine cell load in order to perform appropriate admission and congestion control in the cell does not take this type of situation into account.

Additional information can be valuable in preventing unnecessary admission and control actions. In this case, the increased number of transmit power control commands results at least in part due to a "false alarm" condition caused by the high power transmitting mobile radio UE2. Of course, the increase in transmit power commands may also be a result of additional mobile radios entering the current cell requesting new channels or needing handover support. Thus, it is advantageous to consider one or more factors indicating whether the current cell load condition is attributable in some way to transmissions related to another cellular mobile radio communications system or transmissions in an adjacent frequency band. If the increased load condition is significantly attributable to a transmission in the other cellular system or adjacent frequency band, then little or no congestion/admission control may be necessary. In any event, this type of false alarm information will likely be useful in making congestion/admission decisions for the cell.

Figure 10:
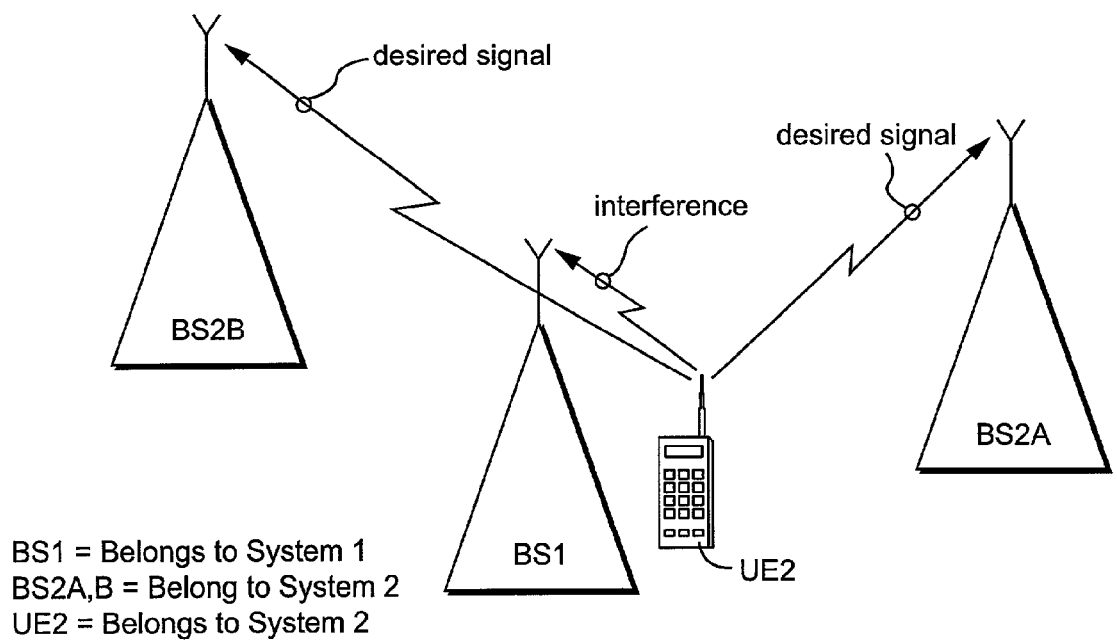
FIG. 10 illustrates a false alarm situation in a cell triggered by a mobile radio transmitting at high power in another frequency band and/or in another cellular system.
Figure 11:
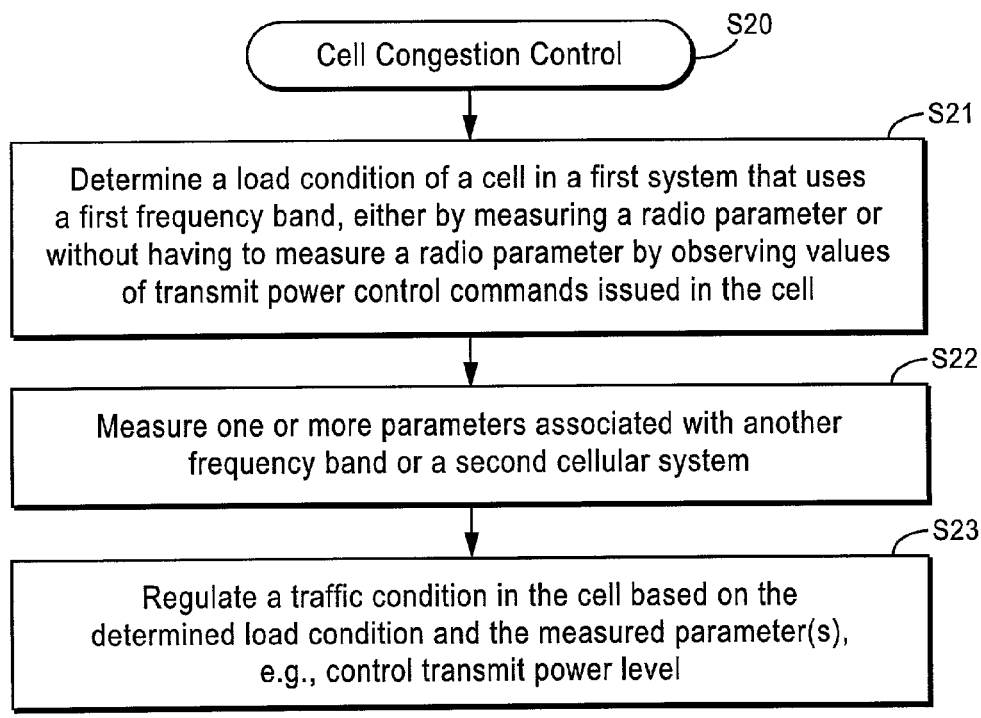
FIG. 11 is a flowchart diagram illustrating procedures for taking into account such an external factor in a cell congestion control algorithm.

A cell congestion control routine (step S20), shown in flowchart form in FIG. 11, outlines a general example procedure for taking into account an external transmission like that shown in FIG. 10 in cell congestion/admission control decisions. Initially, a load condition of a cell in a first cellular system that uses a first frequency band is determined. That determination may be made either (1) by measuring a radio parameter, or preferably, (2) without having to measure a radio parameter by observing values of transmit power control commands issued in the cell (step S21). Although the load condition can be determined by making a measurement of the load, there are certain drawbacks for making such measurements as explained above.

Different cellular systems typically have different frequency bands. In step S22, one or more parameters associated with the other frequency band or the second cellular system are measured which might have an impact on the load condition in the current cell (step S22). A traffic condition in the current cell is regulated based upon the determined load condition and the measured parameter(s) from step S22, e.g., control transmit power levels of transmitters in the cell (step S23). Thus, the radio parameter impacting the load condition of the current cell may be associated with a second cellular mobile radio communications system operating on a second frequency band. In the instance where the radio parameter relates to a transmission in a second frequency band, the first and second frequency bands may be adjacent or non-adjacent. In one example implementation, the radio traffic parameter may be received power or interference level. If the measured received power or interference level exceeds a threshold, then a determination may be made that at least some of the load condition in the current cell in the first cellular system is attributable to a transmission associated with a cellular system. As a result, the traffic condition in the cell may be regulated in a first fashion when the load condition is attributable at least to a first extent to a second cellular system/frequency band transmission. Otherwise, a second type of action or no action at all may be taken when the load condition is not attributable to the second cellular system/frequency band transmission.

Figure 12:
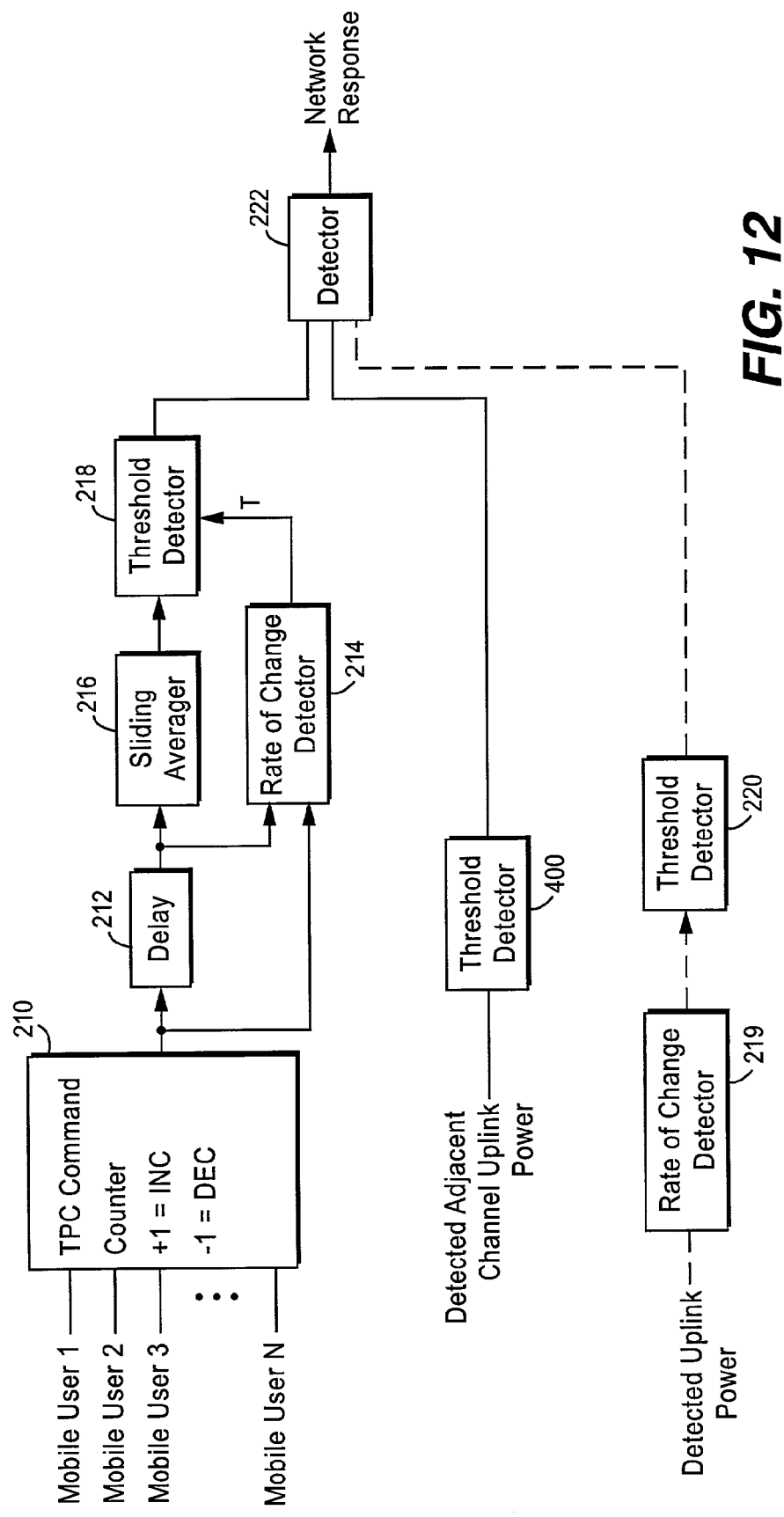
FIG. 12 is a function block diagram illustrating an example implementation of the cell congestion control procedures shown in FIG. 11.

One example embodiment for taking into account additional external factors in accordance with this aspect of the invention is now described in conjunction with FIG. 12. The load condition in this example is monitored in the current cell with a first band of frequencies is determined as shown earlier in FIG. 8 by counting transmit power commands in counter 210 and processing by the various hardware elements 212–218 as described above. An additional input for the detector 222 is an adjacent channel, uplink power exceeding a threshold as detected by a threshold detector 400.

The detector 222 may be a relatively simple logic gate which generates a "no network response" or the like when an output is generated by the threshold detector 400. Alternatively, a more sophisticated detector may be used that follows an algorithm to determine whether a response is appropriate in light of the adjacent channel uplink power present in the current cell, and if so, what type and how much of a response is appropriate. Additionally and optionally, the detected uplink power in the current cell may be monitored for rate of change by the rate of change detector 219, its output being monitored by a threshold detector 220, as described above in conjunction with FIG. 8. The detected adjacent channel uplink power and threshold detector 400 can also be used as an additional input to the detector 222 using the weighted TPC command example embodiment shown above in conjunction with FIG. 9.

Figure 13:
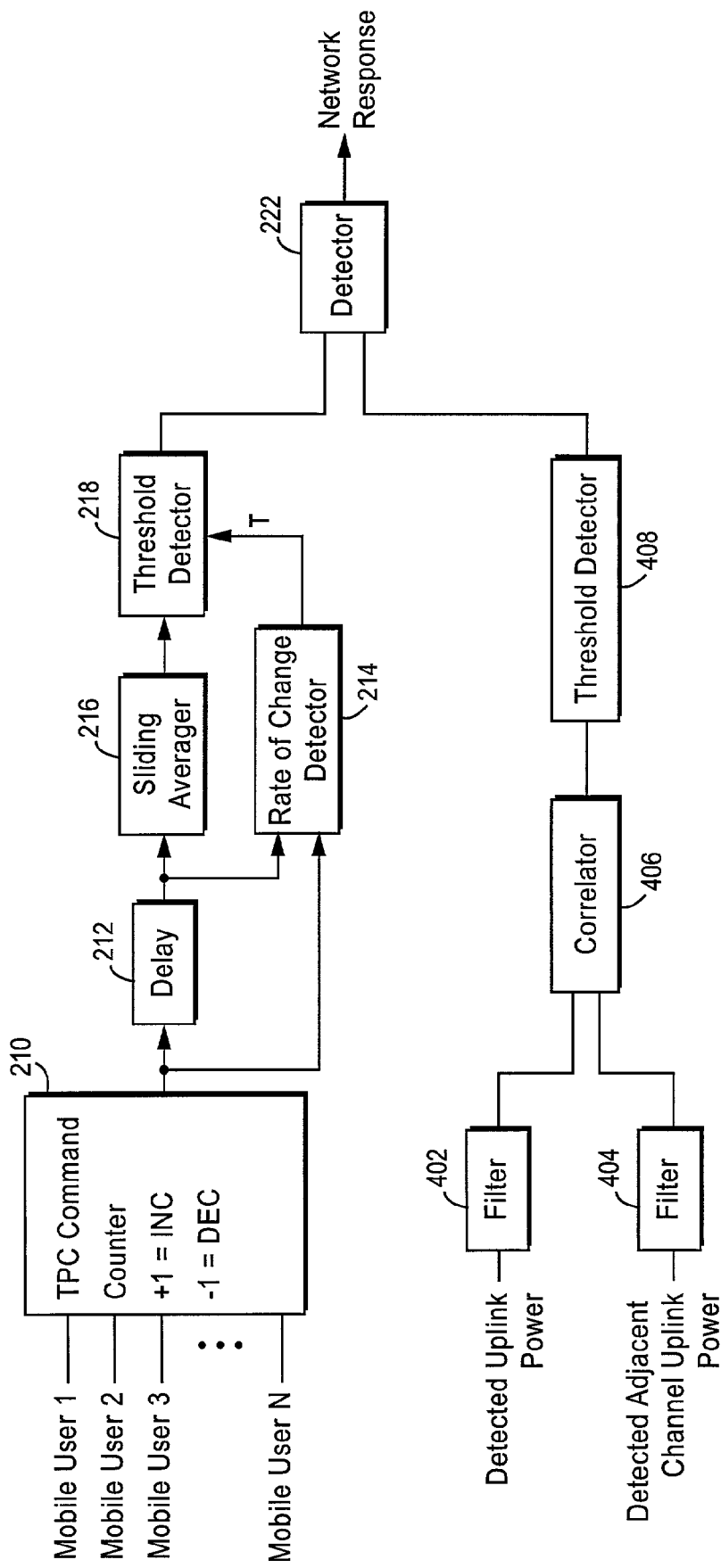
FIG. 13 is a function block diagram illustrating another example implementation of the cell congestion control routine taking into account plural additional factors along with cell load.

Another example implementation described in conjunction with FIG. 13 takes into account both (1) detected adjacent channel uplink power from an adjacent frequency band in another cellular system, and (2) detected uplink power in the current cell. As described above in conjunction with FIG. 8, the load in the current cell is preferably determined using the counted transmit power control commands. Alternatively, the load may be determined using another technique or simply measured in some way. In addition, a measured uplink power in the current cell is input to a fast fading filter 402, and a measured adjacent channel uplink from a different frequency is measured and filtered in a fast fading filter 404. Although there are limitations with making measurements as described in the background, measurement accuracy is not as much an issue in these "false alarm" contexts, since the power levels in those contexts is relatively high easily and sufficiently measured by inexpensive sensors.

The filters 402 and 404 attenuate the influence of uncorrelated, fast fading. The filter outputs are correlated in a correlator 406. The correlated output is compared to a threshold in threshold detector 408. If the correlated, measured, uplink power exceeds the threshold, an output is provided to the detector 222. The detector 222 or the network in response to an output from the detector 222 may then determine that a recent power up series of transmit power control commands, (or other increase in detected load in the cell), is caused by at least in part by "false alarm" type factors. Admission or congestion regulation by the network can then take these factors into account. As with the example embodiment in FIG. 12, the example embodiment illustrated in FIG. 13 may also be implemented using the weighted TPC command load detection shown in FIG. 9.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. For example, although the preferred example embodiments described above are in the context of an uplink power control context, the present invention may also be applied in a downlink power control context. In addition, the admission, congestion, traffic, and power control procedures may be implemented at the RNC, at the base station, or some combination of both. Accordingly, it is intended that the invention be limited only by the scope of the claims appended hereto.

What is claimed is:

1. For use in a first cellular mobile radio communications system supporting communications over a radio interface between a radio network and mobile terminals, a method comprising:
   determining a load condition of a cell in the first cellular mobile radio communications system,
   determining a radio parameter associated with a second cellular mobile radio communications system impacting the load condition of the cell; and
   regulating a traffic condition in the cell based on the determined load condition and the determined radio parameter,
   wherein the load condition is detmined without having to measure a radio parameter and is based on issued transmit power control commands.

2. The method in claim 1, wherein the determining of the load condition of a cell without having to measure a radio parameter includes monitoring a number of increase transmit power commands issued in a cell over a time period relative to a total number of transmit power commands issued in the cell for that time period.

3. The method in claim 1, further comprising:
   weighting each issued transmit power control command, and
   determining the load condition based on the weighted commands.

4. The method in claim 1, wherein the traffic condition is an interference level in the cell, the method further comprising:
   controlling the interference level using the determined load situation and the determined radio parameter.

5. The method in claim 1, wherein the traffic condition is transmit power level, the method further comprising:
   controlling a transmit power of a base station or a channel in the cell using the determined load situation and the determined radio parameter.

6. The method in claim 1, wherein the traffic condition is transmit power, the method further comprising:
   controlling the transmit power of a mobile station using the determined load situation and the determined radio parameter.

7. The method in claim 1, wherein the determining of the radio parameter includes measuring a value of the radio parameter associated with a second cellular mobile radio communications system.

8. The method in claim 7, wherein the measured value is a received power or interference level from the second cellular mobile radio communications system.

9. The method in claim 8, wherein the traffic condition in the cell is regulated in a first fashion if the load condition is attributable to at least a first extent to the second cellular mobile radio communications system, and in a second fashion if the load condition is not attributable to at least the first extent to the second cellular mobile radio communications system.

10. The method in claim 8, wherein the received power or interference level from the second cellular mobile radio communications system is associated with an uplink transmission of a mobile radio associated with the second cellular mobile radio communications system.

11. The method in claim 10, further comprising:
    detecting a power of the uplink transmission;
    filtering the detected power to provide a first filter value; and
    determining if the filtered power exceeds the threshold.

12. The method in claim 11, further comprising:
    measuring an uplink transmit power in the first cellular mobile radio communications system;
    filtering the measured power to provide a second filter value;
    correlating the first and second filter values to provide a correlator output; and
    determining if the correlator output exceeds the threshold.

13. The method in claim 7, further comprising:
    measuring a value associated with the load condition in the first cellular mobile radio communications system, and
    using the measured load condition value, the determined load condition, and the determined radio parameter to regulate the traffic condition in the cellular mobile radio communications system.

14. For use in a first cellular mobile radio communications system supporting communications over a radio interface between a radio network and mobile terminals, a method comprising:
    determining a load condition of a cell, where radio communications in the cell are conducted within a first frequency band;
    determining a radio parameter for a transmission in a second frequency band impacting the load condition of the cell; and
    regulating a traffic condition in the cell based on the determined load condition and the determined radio parameter,
    wherein the load condition is determined without having to measure a radio parameter and is based on issued transmit power control commands.

15. The method in claim 14, wherein the first and second frequency bands are adjacent frequency bands.

16. The method in claim 14, wherein the first frequency band belongs to an operator of the first cellular mobile radio communications system and the second frequency band belongs to a second cellular mobile radio communications system operator.

17. The method in claim 14, wherein the determining of the load condition of a cell without having to measure a radio parameter includes monitoring a number of increase transmit power commands issued in a cell over a time period relative to a total number of transmit power commands issued in the cell for that time period.

18. The method in claim 14, wherein the radio parameter is determined by measurement, the method further comprising:
    if a measured radio parameter associated with the second cellular mobile radio communications system exceeds a threshold, determining that at least some of the load condition of the cell in the first frequency band is attributable to a transmission in the second cellular frequency band.

19. The method in claim 14, wherein the traffic condition in the cell is regulated in a first fashion if the load condition is attributable to at least a first extent to the second frequency band transmission, and in a second fashion if the load condition is not attributable to at least the first extent to the second frequency band transmission.

20. The method in claim 14, wherein the radio parameter is a power level associated with a mobile radio uplink transmission associated with the second frequency band.

21. The method in claim 20, further comprising:
    detecting a power of the uplink transmission associated with the second frequency band;
    filtering the detected power to provide a first filter value; and
    determining if the filtered power exceeds a threshold.

22. The method in claim 21, further comprising:
    measuring an uplink transmit power in the first frequency band;
    filtering the measured power to provide a second filter value;
    correlating the first and second filter values to provide a correlator output; and
    determining if the correlator output exceeds the threshold.

23. For use in a cellular mobile radio communications system supporting communications over a radio interface between a radio network and mobile terminals, apparatus comprising
    electronic circuitry configured to:
        determine a load condition of a cell, where radio communications in the cell are conducted within a first frequency band, and
        determine a radio parameter for a transmission in a second frequency band impacting the load condition of the cell, and
    a controller configured to regulate a traffic condition in the cell based on the determined load condition and the determined radio parameter,
    wherein the load condition is determined without having to measure a radio parameter and is based on issued transmit power control commands.

24. The apparatus in claim 23, wherein the first and second frequency bands are adjacent frequency bands.

25. The apparatus in claim 23, wherein the first frequency band belongs to an operator of the first cellular mobile radio communications system operator and the second frequency band belongs to a second cellular mobile radio communications system operator.

26. The apparatus in claim 23, wherein electronic circuitry includes a counting mechanism for monitoring a number of increase transmit power commands issued in a cell over a time period relative to a total number of transmit power commands issued in the cell for that time period.

27. The apparatus in claim 23, further comprising:
    a sensor for measuring a received power of the transmission in a second frequency band,
    wherein if the measured power exceeds a threshold, the controller is configured to determine that at least some of the load condition of the cell in the first cellular mobile radio communications system is attributable to the second cellular mobile radio communications system.

28. The apparatus in claim 23, wherein the controller is configured to regulate the traffic condition in the cell in a first fashion if the load condition is attributable to at least a first extent to the second frequency band transmission, and in a second fashion if the load condition is not attributable to at least the first extent to the second frequency band transmission.

29. The apparatus in claim 23, wherein the radio parameter is a power level associated with a mobile radio uplink transmission in the second frequency band.

30. The apparatus in claim 29, further comprising:
a detector for detecting a power of the uplink transmission associated with the second frequency band; and
a first filter for filtering the detected power to provide a first filter value,
wherein the controller is configured to determine if the filtered power exceeds a threshold.

31. The apparatus in claim 30, further comprising:
a sensor for measuring an uplink transmit power in the first frequency band;
a second filter for filtering the measured power to provide a second filter value; and
a correlator for correlating the first and second filter values to provide a correlator output,
wherein the controller is configured to determine if the correlator output exceeds the threshold.

32. For use in a first cellular mobile radio communications system supporting communications over a radio interface between a radio network and mobile terminals, apparatus comprising:
means for determining a load condition of a cell in the first cellular mobile radio communications system,
means for determining a radio parameter associated with a second cellular mobile radio communications system impacting the load condition of the cell; and
means for regulating a traffic condition in the cell based on the determined load condition and the determined radio parameter,
wherein the means for determining monitors a number of increase transmit power commands issued in a cell over a time period relative to a total number of transmit power commands issued in the cell for that time period.

33. The apparatus in claim 32, further comprising:
means for weighting each issued transmit power control command,
wherein the means for determining determines the load condition based on the weighted commands.

34. The apparatus in claim 32, wherein the traffic condition is an interference level in the cell, and the means for regulating includes a means for controlling the interference level using the determined load situation and the determined radio parameter.

35. The apparatus in claim 32, wherein the traffic condition is an interference level in the cell, and the means for regulating includes a means for controlling a transmit power of a base station or a mobile radio in the cell using the determined load situation and the determined radio parameter.

36. For use in a first cellular mobile radio communications system supporting communications over a radio interface between a radio network and mobile terminals, apparatus comprising:
means for determining a load condition of a cell in the first cellular mobile radio communications systems,
means for determining a radio parameter associated with a second cellular mobile radio communications system impacting the load condition of the cell; and
means for regulating a traffic condition in the cell based on the determined load condition and the determined radio parameter,
a sensor for measuring a received power associated with a second cellular mobile radio communications system.

37. The apparatus in claim 36, wherein the received power is associated with an uplink transmission of a mobile radio associated with the second cellular mobile radio communications system.

38. The apparatus in claim 37, further comprising:
first means for filtering the detected power to provide a first filter value; and
means for determining if the filtered power exceeds a threshold.

39. The apparatus in claim 38, further comprising:
means for measuring an uplink transmit power in the first cellular mobile radio communications system;
second means for filtering the measured power to provide a second filter value;
means for correlating the first and second filter values to provide a correlator output; and
means for determining if the correlator output exceeds the threshold.

40. For use in a first cellular mobile radio communications system supporting communications over a radio interface between a radio network and mobile terminals, a method comprising:
determining a load condition of a cell in the first cellular mobile radio communications system,
determining a radio parameter associated with a second cellular mobile radio communications system impacting the load condition of the cell; and
regulating a traffic condition in the cell based on the determined load condition and the determined radio parameter,
wherein if a measured received power or interference level associated with the second cellular mobile radio communications system exceeds a threshold, the method further comprises:
determining that at least some of the load condition of the cell in the first cellular mobile radio communications system is attributable to the second cellular mobile radio communications system.

* * * * *